United States Patent
Dong et al.

(10) Patent No.: US 9,780,643 B2
(45) Date of Patent: Oct. 3, 2017

(54) DC POWER SYSTEM FOR MARINE APPLICATIONS

(71) Applicant: GENERAL ELECTRIC COMPANY, Schenectady, NY (US)

(72) Inventors: Dong Dong, Schenectady, NY (US); Ravisekhar Nadimpalli Raju, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 264 days.

(21) Appl. No.: 14/789,111

(22) Filed: Jul. 1, 2015

(65) Prior Publication Data
US 2016/0082907 A1    Mar. 24, 2016

Related U.S. Application Data

(60) Provisional application No. 62/053,400, filed on Sep. 22, 2014.

(51) Int. Cl.
*B60R 16/03* (2006.01)
*B63H 21/17* (2006.01)
(Continued)

(52) U.S. Cl.
CPC .............. *H02M 1/34* (2013.01); *B60R 16/03* (2013.01); *B63H 21/17* (2013.01); *B63J 3/00* (2013.01);
(Continued)

(58) Field of Classification Search
CPC ...... B60R 16/03; B63H 21/17; H02H 7/1225; H02J 1/102; H02J 2001/104; H02J 2001/106; H02M 1/34
(Continued)

(56) References Cited

U.S. PATENT DOCUMENTS

2011/0031931 A1    2/2011    Rembach et al.
2011/0249475 A1    10/2011   Fujii et al.
(Continued)

FOREIGN PATENT DOCUMENTS

WO    2013072226 A2    5/2013

OTHER PUBLICATIONS

European Search Report issued in connection with corresponding EP Application No. 15179042.5 on Jan. 8, 2016.
(Continued)

*Primary Examiner* — Levi Gannon
(74) *Attorney, Agent, or Firm* — Nitin N. Joshi

(57) ABSTRACT

A power system for a marine ship includes a plurality of protection zones, wherein at least two protection zones are coupled to each other via at least one bus-tie converter. Each of the protection zones includes a plurality of direct current (DC) buses and a plurality of power converters. The bus-tie converter includes at least two converter legs coupled by at least one inductor. Each converter leg includes a first branch connected with a snubber circuit by an intermediate switching device. The first branch includes two outer switching devices and at least one inner switching device connected between the two outer switching devices. The snubber circuit includes a combination of a diode, a resistor and a capacitor. A controller controls the operation of the plurality of power converters and the at least one bus-tie converter.

20 Claims, 5 Drawing Sheets

(51) Int. Cl.
*H02J 1/10* (2006.01)
*H02M 1/34* (2007.01)
*B63J 3/00* (2006.01)
*H02M 3/158* (2006.01)
*H02H 7/26* (2006.01)
*H02J 1/00* (2006.01)

(52) U.S. Cl.
CPC ............... *H02H 7/268* (2013.01); *H02J 1/00* (2013.01); *H02J 1/102* (2013.01); *H02M 3/1582* (2013.01); *H02J 2001/104* (2013.01); *H02J 2001/106* (2013.01); *H02M 2001/348* (2013.01)

(58) Field of Classification Search
USPC .......................................................... 307/9.1
See application file for complete search history.

(56) References Cited

U.S. PATENT DOCUMENTS

| | | |
|---|---|---|
| 2011/0285202 A1 | 11/2011 | Rozman et al. |
| 2012/0127769 A1 | 5/2012 | Kern |
| 2013/0215536 A1 | 8/2013 | Eisenhauer et al. |
| 2013/0270902 A1 | 10/2013 | Andersen et al. |
| 2013/0308346 A1* | 11/2013 | Divan .................... H02M 1/34 363/21.01 |
| 2013/0322132 A1 | 12/2013 | Wijekoon et al. |
| 2013/0329329 A1 | 12/2013 | Liu et al. |
| 2014/0055887 A1 | 2/2014 | Uryu et al. |

OTHER PUBLICATIONS

European Search Report issued in connection with related EP Application No. 15178268.7 on Jan. 8, 2016.

Kempkes et al., "Solid-State Circuit Breakers for Medium Voltage DC Power", Electric Ship Technologies Symposium (ESTS), pp. 254-257, Apr. 10-13, 2011.

Cairoli et al., "Coordination Between Supply Power Converters and Contactors for Fault Protection in Multi-Terminal MVDC Distribution Systems", Electric Ship Technologies Symposium (ESTS), 2013 IEEE, pp. 493-499, Apr. 22-24, 2013.

Cairoli et al., "Coordinated Control of the Bus Tie Switches and Power Supply Converters for Fault Protection in DC Microgrids", Power Electronics, vol. 28, Issue 4, pp. 2037-2047, Apr. 2013.

Pietro Cairoli, "Fault Protection in DC Distribution Systems Via Coordinated Control of Power Supply Converters and Bus Tie Switches," University of South Carolina, Theses and Dissertations, pp. i-vii and 1-108, 2013.

* cited by examiner

DC POWER SYSTEM FOR MARINE APPLICATIONS

The present application claims priority to U.S. provisional patent application Ser. No. 62/053,400 filed Sep. 22, 2014.

BACKGROUND

Embodiments of the invention relate generally to a direct current (DC) power system and more specifically to a DC power system for marine applications.

In the last few decades, marine traffic has increased substantially across the world due to tremendous rise in cargo transport vessels, warships, offshore oil ships, passenger ships etc. These vessels or ships have many electrical loads on board. Variable speed electric drives for pumps, fans, electric propulsion installations, lighting and air conditioning are some examples of the electrical loads on board of a ship. The electrical loads operate at various different voltages and frequencies, and thus need separate electric power supplies.

Most of the ships use alternating current (AC) power system architecture. However, more recently some ships are using DC power system architecture including energy storage devices or electrical generators to meet the demands of the plurality of electrical loads. If a load needs alternating current (AC) power supply, the DC power may be converted into AC power with help of power electronic converters. Similarly, if the electrical generator is AC then the AC power may be converted into DC power via power electronic converters. Generally, a plurality of generators supplies power to a plurality of DC buses which in turn supply power to a particular electrical load. There are examples where a single DC bus can also provide power to the entire ship electrical load.

Challenges with conventional DC power system include integration of multiple DC buses with different voltage levels, isolating the faults in the DC power system in a very short time and integrating the various energy storage devices and generators. For these and other reasons, there is a need for the present DC power system for marine applications.

BRIEF DESCRIPTION

In accordance with an embodiment of the present technique, a power system for a marine ship is provided. The power system includes a plurality of protection zones wherein each protection zone comprises a plurality of direct current (DC) buses and a plurality of power converters. Furthermore, at least two DC buses of two protection zones are coupled to each other via a bus-tie converter. A controller is provided to control the operation of the plurality of power converters and the at least one bus-tie converter. The bus-tie converter includes at least two converter legs coupled by at least one inductor. Each converter leg comprises a first branch having two outer switching devices and at least one inner switching device connected between the two outer switching devices. Further, each converter leg comprises a snubber circuit having a combination of a diode, a resistor and a capacitor, wherein the first branch and the snubber circuit are connected by an intermediate switching device.

In accordance with another embodiment of the present technique, a method of providing power to a marine ship is disclosed. The method includes providing a plurality of protection zones including a plurality of power converters and connecting a bus-tie converter between at least two DC buses of two protection zones. In the provided method, connecting the bus-tie converter comprises providing at least two converter legs coupled by at least one inductor. Furthermore, providing each converter legs comprises forming a first branch by connecting at least one inner switching device between two outer switching devices and forming a snubber circuit with a combination of a diode, a resistor and a capacitor. Moreover, providing each converter legs comprises connecting an intermediate switching device between the first branch and the snubber circuit.

DRAWINGS

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. Furthermore, the terms "circuit" and "circuitry" and "controller" may include either a single component or a plurality of components, which are either active and/or passive and are connected or otherwise coupled together to provide the described function.

Figure 1:
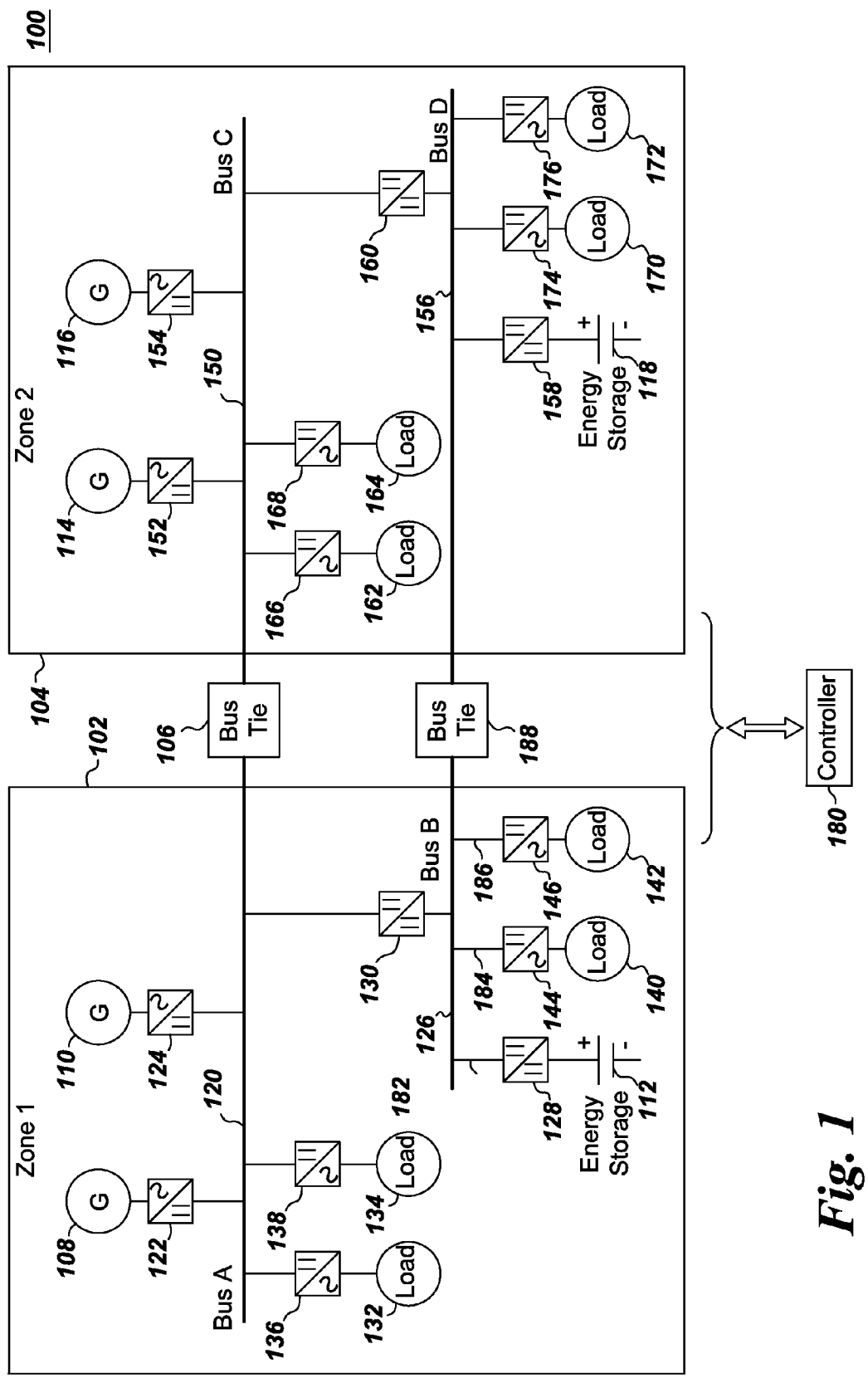
FIG. 1 is a diagrammatical representation of a power system for a marine ship, according to aspects of the present disclosure.

Turning now to the drawings, by way of example in FIG. 1, a power system 100 for a marine ship is depicted. In one embodiment, the power system 100 may include two protection zones 102 and 104 coupled via bus-tie converters 106 and 188. However, in other embodiments, there may be many such protection zones which are connected to each other via a plurality of bus-tie converters. As will be appreciated by those skilled in the art, protection zones are created to limit the extent to which a power system may be disconnected during a fault. The protection zone in the Marine ship may include energy sources, DC buses and a plurality of converters to feed power to various loads. The energy sources may be AC or DC generators, energy storage devices and the loads may include lighting loads or variable frequency drives, for example. In the embodiment shown, protection zone 102 includes energy sources such as AC generators 108, 110 and an energy storage device 112 and protection zone 104 includes energy sources such as AC generators 114, 116 and an energy storage device 118.

Furthermore, in protection zone 102, AC generators 108, 110 feed power to a DC bus 120 via power electronic converters 122 and 124 respectively, and energy storage device 112 feeds power to a DC bus 126 via a power electronic converter 128. Power electronic converters 122, 124 are AC to DC converters as they have to convert power from AC generators to the DC bus whereas power electronic converter 128 is a DC to DC converter as it couples a DC energy storages device to a DC bus. The two DC buses 120 and 126 do not have same DC voltage and hence are coupled to each other via a DC to DC converter 130. DC to DC converter 130 may be a bidirectional DC to DC converter or an unidirectional DC to DC converter. Further, loads 132 and 134 are connected to DC bus 120 via power electronic converters 136 and 138 respectively and loads 140 and 142 are connected to DC bus 122 via power electronic converters 144 and 146 respectively. Depending on whether the load is an AC load or a DC load, power electronic converter 136, 138, 144 and 146 may be AC to DC converters or DC to DC converters.

In similar manner, in protection zone 104, AC generators 114, 116 feed power to a DC bus 150 via power electronic converters 152 and 154 respectively, and energy storage device 118 feeds power to a DC bus 156 via a power electronic converter 158. The two DC buses 150 and 156 are coupled to each other via a DC to DC converter 160. DC Furthermore, loads 162 and 164 are connected to DC bus 150 via power electronic converters 166 and 168 respectively and loads 170 and 172 are connected to DC bus 152 via power electronic converters 174 and 176 respectively. Based on the type of load i.e., an AC load or a DC load, power electronic converter 166, 168, 174 and 176 may be AC to DC converters or DC to DC converters. It should be noted that in the embodiment shown, all converters have been shown to have only one input terminal and one output terminal for ease of explanation. However, a negative terminal or a reference terminal is always there at the input and the output of each of the converter.

Power System 100 further includes a controller 180 to control the operation of bus-tie converters 106, 188 and other converters in protection zones 102 and 104. It should be noted that even though a single controller 180 is shown in the embodiment of FIG. 1, in other embodiments controller 180 may be split into a plurality of controllers and each individual controller may control a part of the power system 180. Power system 100 may also include passive devices such as fuses and/or circuit breakers (not shown) to protect a second of the power system 100 during a fault (e.g., short circuit fault). In one embodiment, controller 180 blocks propagation of a fault from one DC bus to another DC bus based on the coordination between the bus-tie converter, the passive devices and other power electronic and/or DC to DC converters.

For example, if there is a fault on DC bus 126 or the subsequent branches connected to it (e.g., branches 182, 184, 186 in FIG. 1), then controller 180 would block propagation of that fault (i.e., one fault creating another fault) from DC bus 126 to DC bus 120. It should be noted that the fault may be detected by controller 180 if an output current of converter 130 exceeds a fault current magnitude threshold or if an output voltage of converter 130 breaches a fault voltage magnitude threshold. During the fault on DC bus 126, controller 180 would operate DC to DC converter 130 which is feeding power to DC bus 126 in a current control mode and thus limits a fault current supplied by DC bus 120 to DC bus 126. Once the fault is cleared by passive devices (e.g., fuse or breaker) with the help of controller 180 or otherwise, controller 180 will charge DC bus 126 to a rated level. Once DC bus 126 is charged to the rated level, controller 180 will switch back operation of DC to DC converter 130 to a normal mode. In one embodiment, the normal mode of DC to DC converter 130 refers to a voltage control mode. However, if the fault sustains for a certain amount of time, which indicates a permanent fault on the bus and not a transient one, controller 180 will stop the operation of DC/DC converter 130 and notify the upstream system. Controller 180 would similarly control other converters so as to block propagation of the fault from one bus to another bus.

In one embodiment of the present technique, a second bus-tie converter 188 may be used to connect low voltage buses 126 and 156. In other words, protection zones 102 and 104 may be coupled to each other via two bus-tie converters 106 and 188. Bus-tie converter 106 couples medium voltage buses 120 and 150 and bus-tie converter 188 couples low voltage buses 126 and 156. It should be noted that low voltage buses 126 and 156 operate at a low voltage with respect to medium voltage buses 120 and 150 respectively. This embodiment allows low voltage buses 126 and 156 and their corresponding branches to operate normally even if one of the medium voltage buses 120 or 150 is faulty and unable to supply any power.

Figure 2:
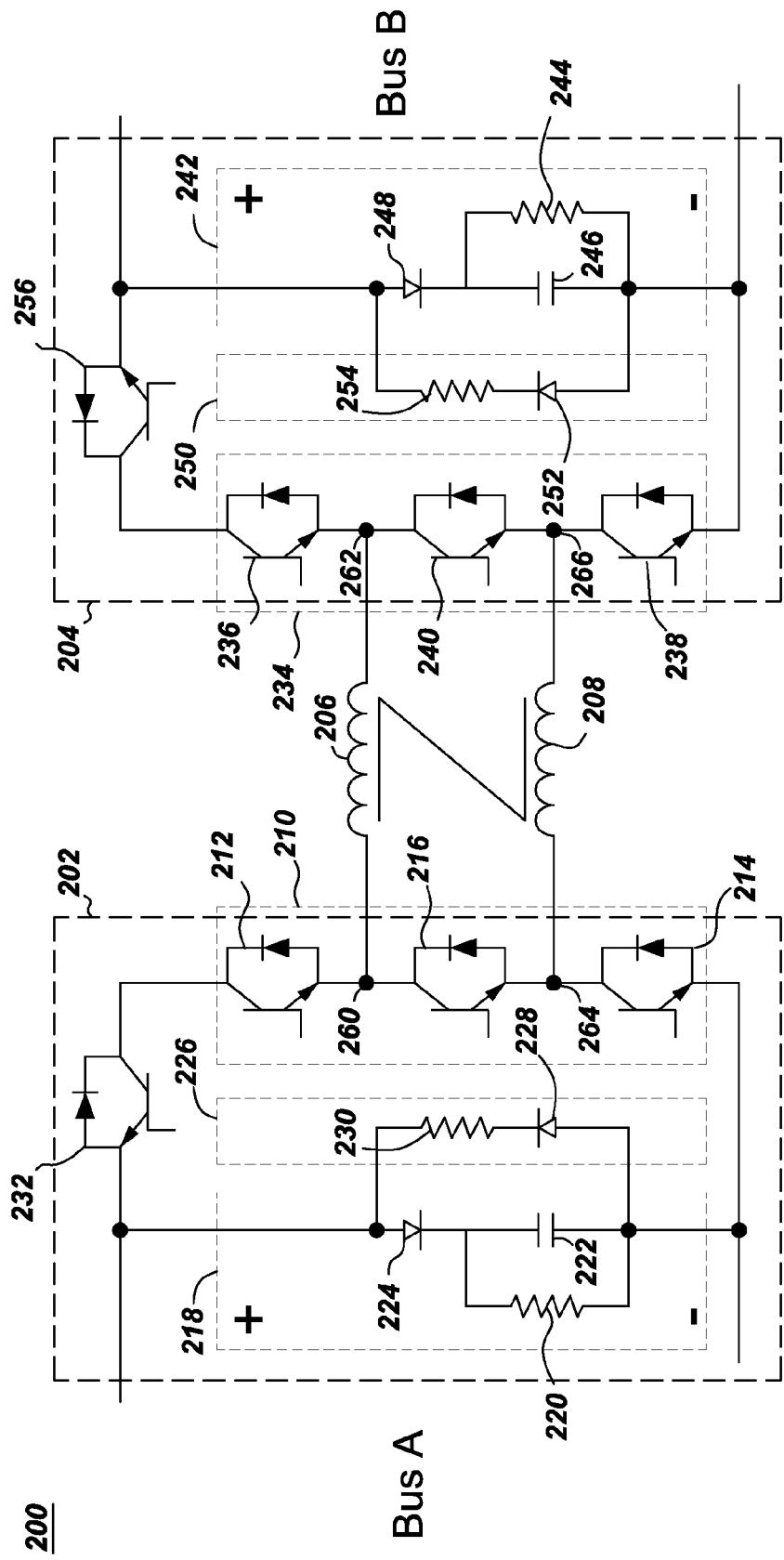
FIG. 2 is a diagrammatical representation of a detailed view of a bus-tie converter of FIG. 1, according to aspects of the present disclosure.

FIG. 2 shows a detailed view of a bus-tie converter 200 such as bus-tie converters 106 and 188 of FIG. 1 in accordance with an embodiment of the present technique. In one embodiment, bus-tie converter 200 is coupled between two buses A and B of two protection zones 102 and 104 respectively. In other words, bus-tie converter 200 is directly connected between the buses, A and B. The bus-tie converter 200 facilitates power transfer between two zones 102, 104 during normal conditions and also isolates the two protection zones 102, 14 in case of a fault. The bus-tie converter 200 includes a first converter leg 202 and a second converter leg 204 coupled by at least one inductor 206, 208.

First converter leg 202 includes a first branch 210 having two outer switching devices 212, 214 and one inner switching device 216. The inner switching device 216 is connected between the two outer switching devices 212, 214. First converter leg 202 further includes a snubber circuit 218 having a resistor 220 and a capacitor 222 connected in parallel. The snubber circuit 218 further includes a diode 224 connected in series with a parallel circuit of resistor 220 and capacitor 222. The snubber circuit 218 and the first branch 202 are connected to each other by an intermediate switching device 232. In one embodiment, the intermediate switching device 232 has an opposite polarity with respect to the outer switching devices 212, 214 and the inner switching device 216. In other words, intermediate switching device 232 is connected in opposite manner to the outer switching device 212. The first converter leg 202 also includes a second branch 226 having a second diode 228 and a damping resistor 230 connected in series. The second branch 226 is connected in parallel with the snubber circuit 218.

Similarly, second converter leg 204 includes a first branch 234 having one inner switching device 240 connected between two outer switching devices 236, 238. Second converter leg 204 further includes a snubber circuit 242 having a resistor 244 and a capacitor 246 connected in parallel and further the combination being connected in series with a diode 248. The snubber circuit 242 and the first branch 234 are connected to each other by an opposite polarity intermediate switching device 256. The second converter leg 204 also includes a second branch 250 connected in parallel with the snubber circuit 242. The second branch 250 includes a second diode 252 and a damping resistor 254 connected in series.

As discussed earlier, the first converter leg 202 and the second converter leg 204 are coupled to each other by inductors 206 and 208. In one embodiment, inductor 206 is connected between nodes 260, 262, wherein node 260 is formed by an interconnection of outer switching device 212 and inner switching device 216 and node 262 is formed by an interconnection of outer switching device 236 and inner switching device 240. Similarly, inductor 208 is connected between nodes 264, 266, wherein node 264 is formed by an interconnection of outer switching device 214 and inner switching device 216 and node 262 is formed by an interconnection of outer switching device 238 and inner switching device 240.

The switching devices 232, 212, 214, 236, 238, 216 and 240 may include controllable semiconductor switches. The controllable semiconductor switches include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof. Furthermore, when the controllable semiconductor switches 212, 214, 236, 238 open an inductive circuit made up of bus parasitic inductances in buses A and B, the energy in these parasitic inductance will be absorbed by the snubber circuits 218, 242 respectively. Thus, the voltage spike generated across these switching devices because of sudden change of inductive current (i.e., L di/dt) is reduced. Snubber circuits 218, 242 also maintain the respective bus voltage to a normal operating value when there is a fault in the other protection zone. Diodes 224, 248 in snubber circuits 218, 242 ensure that in case of fault on their respective buses, the snubber capacitors 222, 246 do not discharge into the fault, rather the capacitors 222, 246 discharge via resistors 220, 244 respectively.

Figure 3:
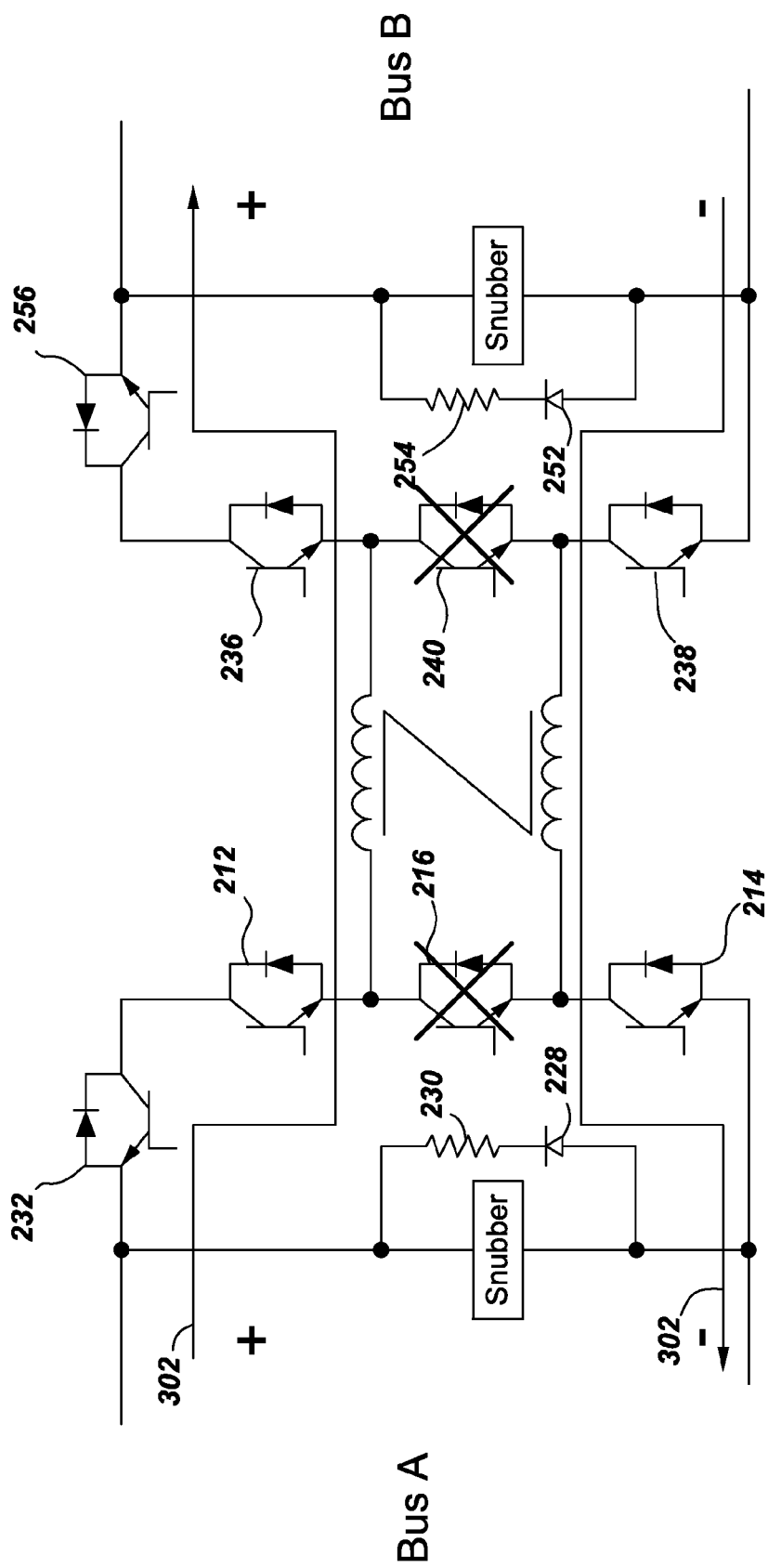
FIG. 3 is a schematic diagram representation of the normal operation of the bus-tie converter of FIG. 2, according to aspects of the present disclosure.

FIG. 3 shows the operation of the bus-tie converter 200 of FIG. 2 during a normal condition, i.e., a no fault condition. During normal operation, controller 180 (FIG. 1) sends control signals to switch on the outer switching devices 212, 214 and 236, 238 of legs 202 and 204 respectively. Furthermore, controller 180 sends control signals to switch on intermediate switches 232 and 256. Thus, during normal condition, the power transfer between the two buses A and B of two different protection zones is facilitated by switching devices 232, 212, 236, 256, 214, 238 and inductors 206, 208 respectively. In the embodiment shown in FIG. 3, the power transfer is facilitated from bus A to bus B as shown by current 302. Since the intermediate switching device 232 is connected in opposite polarity with respect to current 302, to facilitate the power transfer from bus A to bus B an antiparallel diode of intermediate switching device 232 conducts and carries the current 302. Similarly, since outer switching devices 236, 238 are connected in opposite polarity with respect to current 302, the antiparallel diodes of outer switching devices 236 and 238 conduct to carry the current 302.

Figure 4A:
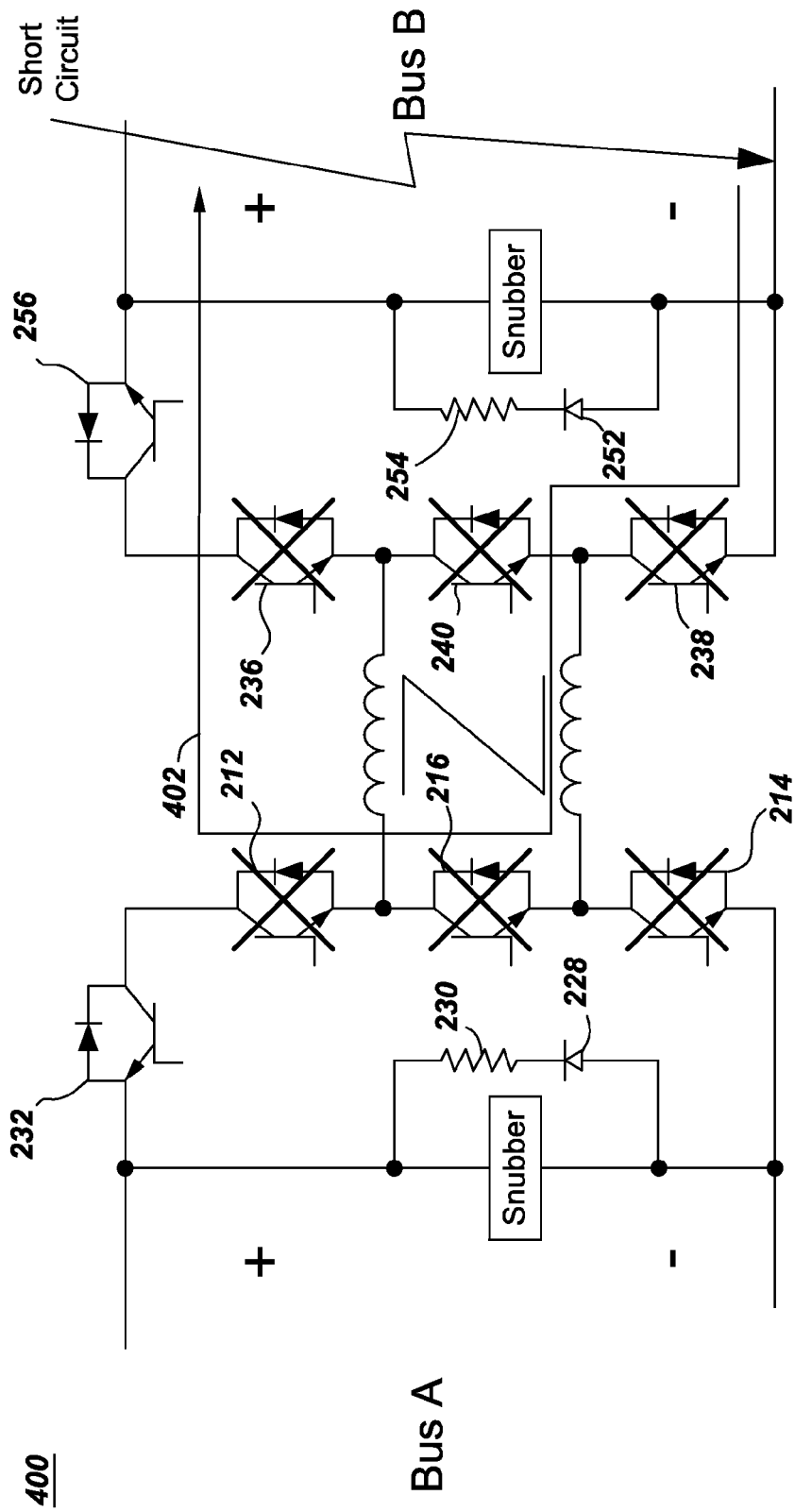
FIGS. 4a and 4b are schematic diagram representations of the fault condition operation of the bus-tie converter of FIG. 2, according to aspects of the present disclosure.
Figure 4B:
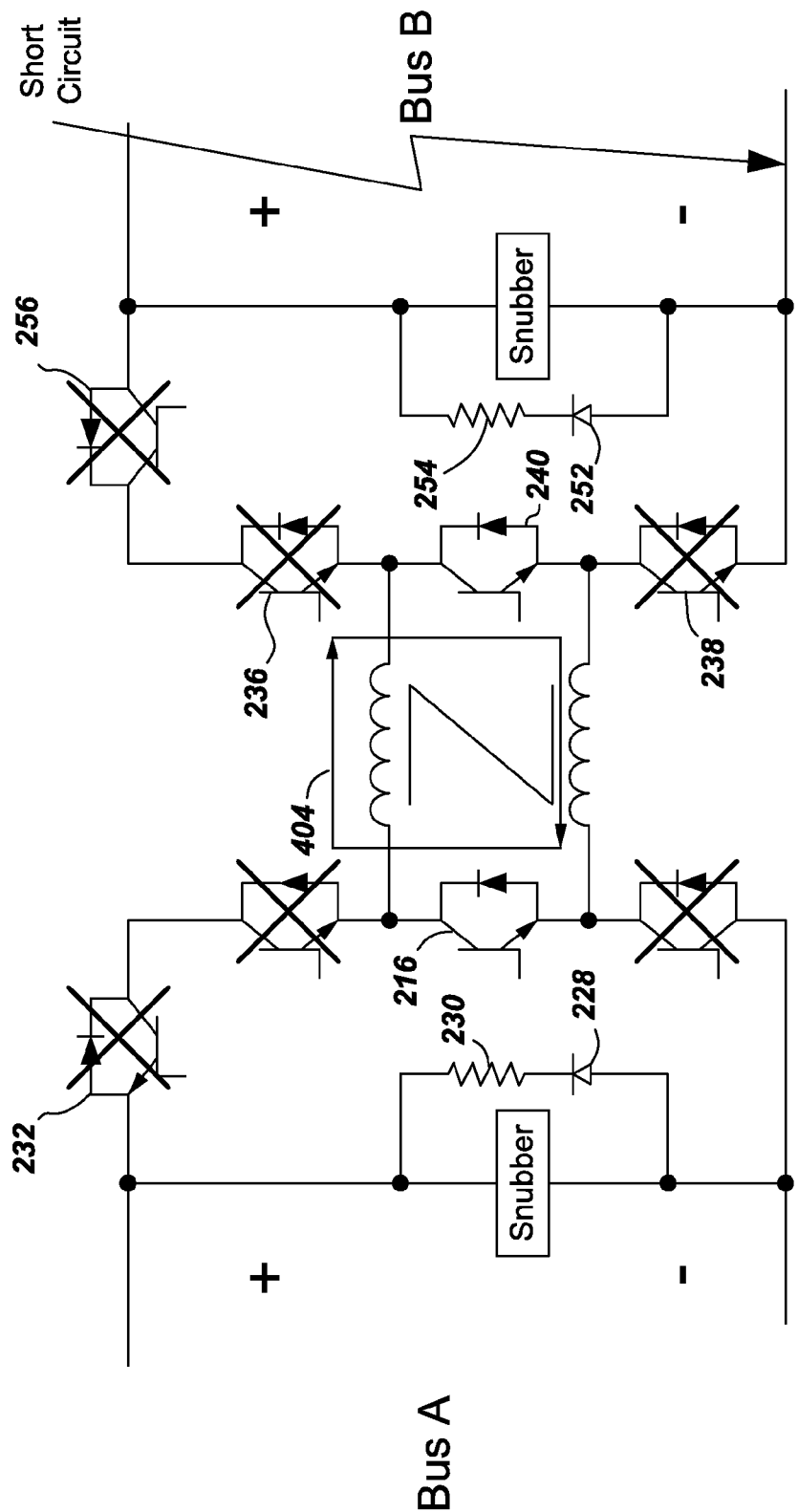

FIGS. 4a and 4b show the operation of the bus-tie converter 200 of FIG. 2 during a fault condition. In the embodiment shown there is a short circuit fault on bus B. During such a fault condition the controller sends controls signals to switch off outer switching devices 212, 214, 236 and 238 as shown in FIG. 4a. At this instant, a fault current 402 cannot flow to intermediate switch 232 as outer switching device 212 is switched off. However, the fault current 402 can flow from antiparallel diodes of outer switching devices, 236, 238 and the antiparallel diode of inner switching device 216 and intermediate switching device 256 during this condition. Thereafter, inner switching devices 216 and 240 are switched ON by the controller as shown in FIG. 4b and thus, a circulating current 404 then flows between the antiparallel diode of inner switching device 216 and the inner switching device 240. Any time after the inner switching devices 216 and 240 have been switched ON, intermediate switching devices 232 and 256 may be switched OFF by the controller. During this time, the inner switching devices 216, 240 carry only the inductor current and even that inductor current may decay down after a while. This results in complete isolation of the two buses A and B of two different protection zones. The fault current on bus B may then be decayed to a reduced value by damping resistor 254 and second diode 252.

Advantages of the present technique include ability to disconnect the two protection zones extremely fast during a fault scenario. Furthermore, since the two zones are coupled during normal operation, energy storage elements, the different zones can share the same energy storage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power system for a marine ship, comprising:
   a plurality of protection zones, each protection zone including a plurality of direct current (DC) buses and a plurality of power converters;
   a bus-tie converter to couple the at least two DC buses of two protection zones, the said bus-tie converter comprising:
   at least two converter legs coupled by at least one inductor, each converter leg including:
   a first branch having two outer switching devices and at least one inner switching device connected between the two outer switching devices;
   a snubber circuit having a combination of a diode, a resistor and a capacitor, wherein the first branch and the snubber circuit are connected by an intermediate switching device; and
   a controller to control the operation of the plurality of power converters and the at least one bus-tie converter.

2. The power system of claim 1, wherein the intermediate switching device has an opposite polarity with respect to the outer switching devices and the inner switching device.

3. The power system of claim 1, wherein the at least one inductor is connected between the two inner switching devices of the two protection zones.

4. The power system of claim 1, wherein the at least two outer switching devices, the inner switching device and the intermediate switching device comprise controllable semiconductor switches.

5. The power system of claim 4, wherein the controllable semiconductor switch comprises an insulated gate bipolar transistor, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof.

6. The power system of claim 1, wherein the controller blocks power flow between a faulty protection zone and a non-faulty protection zone by controlling the bus-tie converter.

7. The power system of claim 1, wherein the controller switches ON two outer switching devices and the intermediate switching device of each converter leg of the bus-tie converter during normal operation.

8. The power system of claim 7, wherein the controller switches OFF two outer switching devices of each converter leg of the bus-tie converter when there is a fault on the at least one protection zone and facilitates a current between the intermediate switching devices and antiparallel diodes of outer switching devices of each converter legs.

9. The power system of claim 8, wherein the controller switches ON inner switching devices after outer switching devices have been switched OFF and facilitates a circulating current between the inner switching devices.

10. The power system of claim 9, wherein the controller switches OFF the intermediate switching devices after inner switching devices have been switched ON.

11. The power system of claim 1, wherein each converter leg further includes a second branch connected across the snubber circuit, said second branch having a second diode connected in series with a damping resistor to dissipate a fault current after intermediate switching devices have been switched off.

12. A method of providing power to a marine ship comprising:
providing a plurality of protection zones, each protection zone including a plurality of direct current (DC) buses and a plurality of power converters;
connecting a bus-tie converter between the at least two DC buses of two protection zones, wherein connecting the bus-tie converter includes:
providing at least two converter legs coupled by at least one inductor, wherein providing each converter legs comprises:
forming a first branch by connecting at least one inner switching device between two outer switching devices;
forming a snubber circuit with a combination of a diode, a resistor and a capacitor; and
connecting an intermediate switching device between the first branch and the snubber circuit.

13. The method of claim 12, wherein connecting the intermediate switching device comprises connecting the intermediate switching device in opposite polarity with respect to the outer switching devices and the inner switching devices.

14. The method of claim 12 comprises connecting the at least one inductor between the two inner switching devices of the two protection zones.

15. The method of claim 12 further comprises blocking power flow between a faulty protection zone and a non-faulty protection zone by controlling the bus-tie converter.

16. The method of claim 15, wherein controlling the bus-tie converter comprises switching ON two outer switching devices and the intermediate switching device of each converter leg during normal operation.

17. The method of claim 16 comprising switching OFF two outer switching devices of each converter leg of the bus-tie converter when there is a fault on the at least one protection zone and facilitating a current between the intermediate switching devices and antiparallel diodes of outer switching devices of each converter legs.

18. The method of claim 17 comprising switching ON inner switching devices after outer switching devices have been switched OFF and facilitating a circulating current between the inner switching devices.

19. The method of claim 18 further comprising switching OFF the intermediate switching devices after inner switching devices have been switched ON.

20. The method of claim 12, wherein providing each converter leg further comprises connecting a second branch in parallel with the snubber circuit, said second branch including a second diode connected in series with a damping resistor to dissipate a fault current after intermediate switching devices have been switched off.

* * * * *